(12) United States Patent
McCune

(10) Patent No.: US 8,172,716 B2
(45) Date of Patent: May 8, 2012

(54) EPICYCLIC GEAR SYSTEM WITH SUPERFINISHED JOURNAL BEARING

(75) Inventor: Michael E. McCune, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 439 days.

(21) Appl. No.: 12/491,583

(22) Filed: Jun. 25, 2009

(65) Prior Publication Data

US 2010/0331139 A1 Dec. 30, 2010

(51) Int. Cl.
*F16H 57/08* (2006.01)
(52) U.S. Cl. .................................................. 475/331
(58) Field of Classification Search .......... 475/159, 475/160, 331, 334; 384/276, 625
See application file for complete search history.

(56) References Cited

U.S. PATENT DOCUMENTS

| 4,491,500 | A | 1/1985 | Michaud et al. |
| 4,818,333 | A | 4/1989 | Michaud |
| 5,102,379 | A | 4/1992 | Pagluica et al. |
| 5,433,674 | A | 7/1995 | Sheridan et al. |
| 5,503,481 | A | 4/1996 | Hashimoto et al. |
| 6,223,616 | B1 | 5/2001 | Sheridan |
| 6,964,155 | B2 | 11/2005 | McCune et al. |
| 7,005,080 | B2 | 2/2006 | Holland et al. |
| 7,021,042 | B2 | 4/2006 | Law |
| 7,195,578 | B2 * | 3/2007 | Dalenberg et al. ............ 475/331 |
| 2002/0106978 | A1 | 8/2002 | Michaud et al. |
| 2005/0014597 | A1 * | 1/2005 | Michaud et al. ............ 475/344 |
| 2007/0225111 | A1 | 9/2007 | Duong et al. |
| 2008/0116010 | A1 | 5/2008 | Portlock et al. |

FOREIGN PATENT DOCUMENTS

| EP | 2172577 | 4/2010 |
| WO | 2010002369 | 1/2010 |

OTHER PUBLICATIONS

European Search Report Jun. 10, 2010, 8 pages.
George E. Totten, Handbook of Lubrication and Tribology: Application and Maintenance, 2nd Edition, 2006, pp. 31-15, CRC Press.

* cited by examiner

*Primary Examiner* — Roger Pang
(74) *Attorney, Agent, or Firm* — Kinney & Lange, P.A.

(57) ABSTRACT

An epicyclic gear assembly includes a ring gear, a sun gear, at least one star gear enmeshed between the ring gear and sun gear, a carrier and a journal bearing. The carrier is disposed adjacent the rotatable sun gear and star gear. The journal bearing is disposed in the at least one star gear and connected to the carrier. The journal bearing has an outer radial surface with an amorphous surface finish of less than about 5 micro inches (127 micro mm) measured on an $R_a$ scale and the outer surface of the journal bearing interfaces with an inner surface of the star gear.

14 Claims, 3 Drawing Sheets

EPICYCLIC GEAR SYSTEM WITH SUPERFINISHED JOURNAL BEARING

BACKGROUND

The present invention relates to gas turbine engines, and more particularly, to an epicyclic gear system for use in gas turbine engines.

Epicyclic gear trains are complex mechanisms for reducing or increasing the rotational speed between two rotating shafts or rotors. The compactness of planetary or star system gear trains makes them appealing for use in aircraft engines.

The forces and torque transferred through an epicyclic gear train place tremendous stresses on the gear train components, making them susceptible to breakage and wear. However, imperfect alignment of the longitudinal axes of an epicyclic gear train's sun gear, star gear, and ring gear with an input shaft is common due to numerous factors including imbalances in rotating hardware, manufacturing imperfections, and transient flexure of shafts and support frames due to aircraft maneuvers. This misalignment necessitates increased amounts of lubrication (i.e. to form an adequate film thickness) between each journal bearing and interfacing star gear than would otherwise be necessary. Additionally, this misalignment increases the amount of wear experienced by the journal bearing and interfacing star gear. Thus, there is a need for an epicyclic gear system that can accommodate misalignment with a lower degree of wear.

SUMMARY

An epicyclic gear assembly includes a ring gear, a sun gear, at least one star gear enmeshed between the ring gear and sun gear, a carrier and a journal bearing. The carrier is disposed adjacent the rotatable sun gear and star gear. The journal bearing is disposed in the at least one star gear and connected to the carrier. The journal bearing has an outer radial surface with an amorphous surface finish of less than about 5 micro inches (127 micro mm) measured on an $R_a$ scale and the outer surface of the journal bearing interfaces with an inner surface of the star gear.

DETAILED DESCRIPTION

Figure 1:
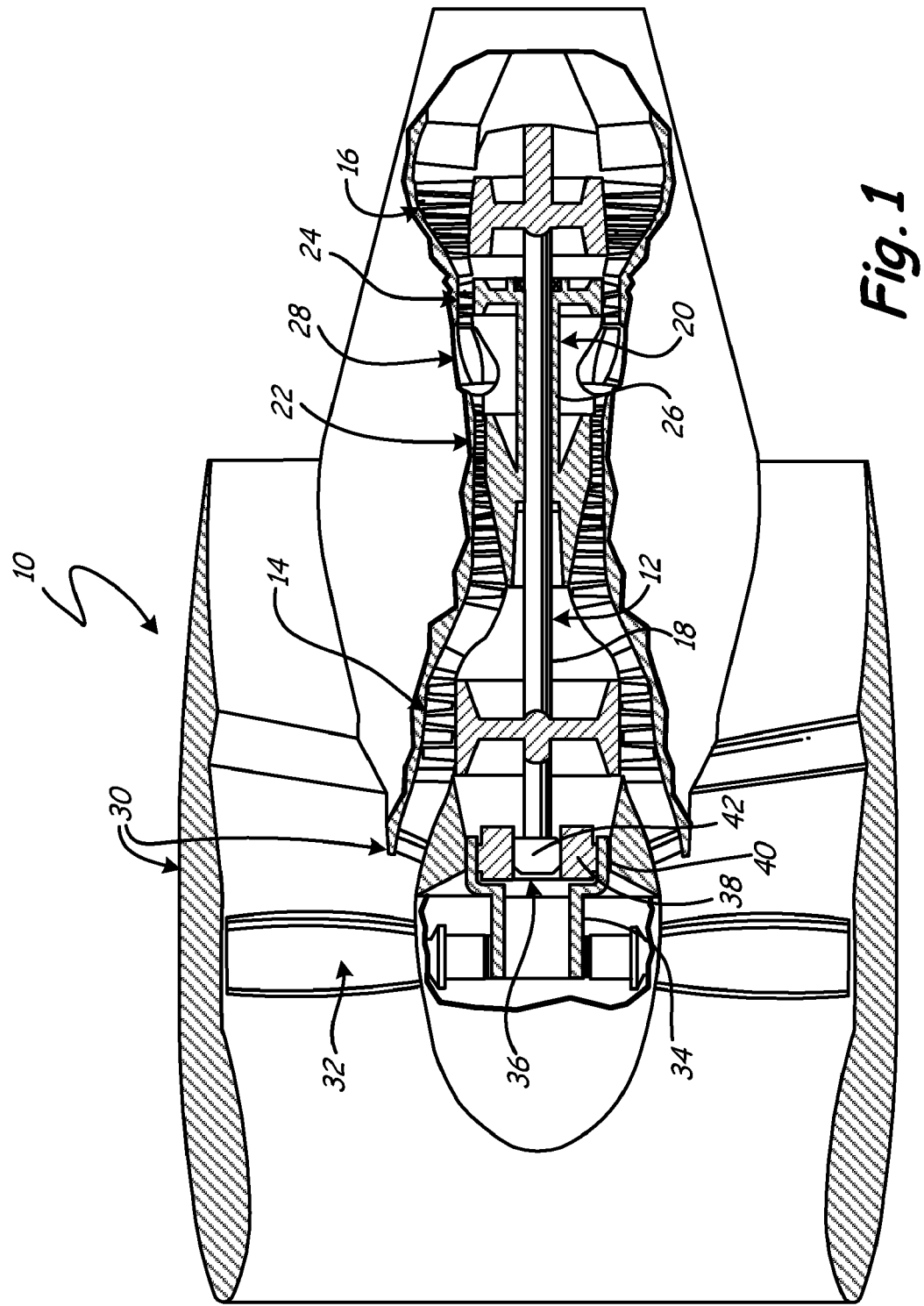
FIG. 1 is a schematic cross-sectional side view of a gas turbine engine with an epicyclic gear system.

FIG. 1 is a schematic cross-sectional side view of gas turbine engine 10. Gas turbine engine 10 includes low pressure unit or pack 12 (which includes low pressure compressor 14 and low pressure turbine 16 connected by low pressure shaft 18), high pressure unit or pack 20 (which includes high pressure compressor 22 and high pressure turbine 24 connected by high pressure shaft 26), combustor 28, nacelle 30, fan 32, fan shaft 34, and epicyclic gear system 36. Epicycle gear system 36 includes star gear 38, ring gear 40, and sun gear 42. The general construction and operation of gas turbine engines is well-known in the art.

As shown in FIG. 1, low pressure unit 12 is coupled to fan shaft 34 via epicyclic gear system 36. Sun gear 42 is attached to and rotates with low pressure shaft 18. Sun gear 42 is rotatably mounted on low pressure shaft 18. Ring gear 40 is connected to fan shaft 34 which turns at the same speed as fan 32. Star gear 38 is enmeshed between sun gear 42 and ring gear 40 such that star gear 38 rotates when sun gear 42 rotates. Star gear 38 is rotatably mounted on the stationary gear carrier (not shown) by stationary journal bearing (not shown). When low pressure unit 12 rotates, epicyclic gear system 36 causes fan shaft 34 to rotate at a slower rotational velocity than that of low pressure unit 12, but in the opposite direction.

In an alternative embodiment to the embodiment shown in FIG. 1, epicyclic gear system 36 can be configured in a different manner sometimes called a planetary gear system. In this alternative configuration star or "planet" gear 38 is rotatably mounted on the gear carrier by bearings. Star gear 38 meshes with sun gear 42. Mechanically grounded, internally toothed ring gear 40 circumscribes and meshes with star gear 38. Input and output shafts extend from sun gear 42 and the gear carrier respectively. During operation, the input shaft rotatably drives sun gear 42, rotating star gear 38 about its own axis, and because ring gear 40 is mechanically grounded, causes star gear 38 to orbit the sun gear 42 in the manner of a planet. Orbital motion of star gear 38 turns the gear carrier and the output shaft in the same direction as the input shaft.

The present application describes epicyclic gear system 36 with interfacing star gear 38 and journal bearing (not shown) surfaces configured to reduce operational friction therebetween. In this manner, epicyclic gear system 36 operates with an increased moment capability (effective operation can occur with axes of gears 38, 40 and 42 misaligned to a greater degree than could otherwise occur with conventional epicyclic gear systems) and reduced bearing temperatures in a boundary regime condition. More particularly, interfacing star gear 38 and the journal bearing surfaces have a composition that achieves a tribological pairing and either star gear 38 or journal bearing is subject to a manufacturing process that achieves a smooth amorphous surface finish. The tribological pairing of star gear 38 and journal bearing surfaces along with the smooth amorphous finish of the surface of either star gear 38 or the journal bearing allows epicyclic gear system 36 to operate with increased moment capability of about 20 percent when compared to conventional epicyclic gear systems. The tribological pairing of star gear 38 and journal bearing surfaces along with the smooth amorphous finish of the surface of either star gear 38 or the journal bearing also reduces bearing temperatures in the boundary regime condition by about 10 to 15 percent. By reducing the temperature in the boundary regime condition, operational wear between star gear 38 and the journal bearing can be reduced, thus increasing the operation life of the epicyclic gear system 36. By increasing the moment capability of epicyclic gear system 36, the size and weight of epicyclic gear system 36 can be reduced.

Figure 2:
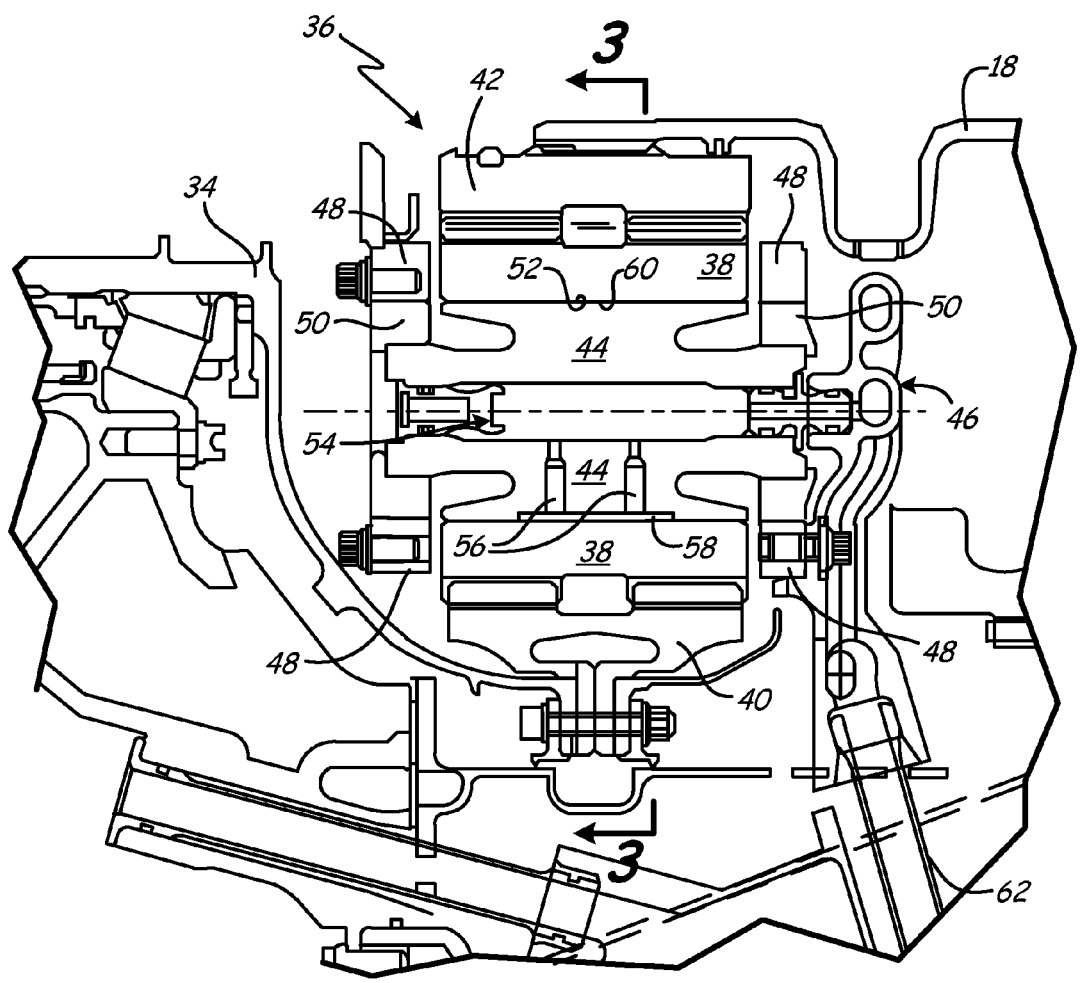
FIG. 2 is a schematic cross-sectional view of the epicyclic gear system of FIG. 1.

FIG. 2 is a cross-sectional view of epicyclic gear system 36 taken through only a single star gear 38. Epicyclic gear system 36, however, includes multiple star gears arranged circumferentially around the sun gear 42. In addition to star gear 38, ring gear 40, and sun gear 42, epicyclic gear system 36 includes journal bearing 44, lubricant manifold 46, carrier 48, and end caps 50. Journal bearing 44 has interface surface 52 and includes axial passage 54 and radial passages 56. Radial passages 56 fluidly connect to distribution recess 58. Star gear 38 includes inner surface 60. Lubricant manifold 46 is connected to feed tube 62.

As discussed previously, in one embodiment, low pressure unit 12 (FIG. 1) is coupled to fan shaft 34 via epicyclic gear system 36. Sun gear 42 is attached to and rotates with low pressure shaft 18 (FIG. 1). Sun gear 42 is rotatably mounted on low pressure shaft 18. Carrier 48 is stationarily mounted within gas turbine engine 10 (FIG. 1) to the non-rotating engine case walls radially outboard of gear system 36. Carrier 48 has two generally interfacing faces which support the ends of the stationary journal bearing 44. Ring gear 40 is connected to fan shaft 34 (FIG. 1) which turns at the same speed as fan 32 (FIG. 1). Star gear 38 (only one is illustrated although epicyclic gear system 36 includes a set of multiple star gears) is enmeshed between sun gear 42 and ring gear 40 such that star gear 38 rotates when sun gear 42 rotates. Star gear 38 is rotatably mounted on the stationary carrier 48 by journal bearing 44. When low pressure unit 12 rotates, epicyclic gear system 36 causes fan shaft 34 to rotate at a slower rotational velocity than that of low pressure unit 12. The operation of similar epicyclic gear systems and lubrication systems for epicycle gear systems are further detailed in U.S. Pat. Nos. 6,223,616 and 5,102,379, which are herein incorporated by reference.

In the embodiment shown in FIG. 2, stator journal bearing 44 is positioned inside of rotatable star gear 38. Lubricant manifold 46 is disposed adjacent to journal bearing 44 and is fluidly connected thereto. Star gear 38 is rotatably mounted on carrier 48 by bearings. More specifically, star gear 38 is rotatably mounted on carrier 48 by journal bearing 44. End caps 50 are welded or otherwise affixed to journal bearing 44 and press fit into carrier 48. End caps 50 and carrier 48 provide support for journal bearing 44. Fasteners extend through end caps 50 and connect to carrier 48 to act as an anti-rotation feature to keep journal bearing 44 stationary.

Axial passage 54 is fluidly connected to lubricant manifold 46. Lubricant manifold 46 is fed pressurized lubricant from other components of the gas turbine engine via feed tube 62. Liquid lubricant from lubricant manifold 46 is supplied through axial passage 54 to radial passages 56. After leaving cavity 56, the lubricant flows through radial passages 56 into distribution recess 58 between journal bearing 44 and star gear 38. Distribution recess 58 extends along the exterior surface of journal bearing 44. The lubricating liquid forms a film of lubrication on journal bearing 44 in the distribution recess 58. From distribution recess 58 the film of lubrication spreads circumferentially and axially due to viscous forces between star gear 38 and journal bearing 44. The lubricant film helps to support star gear 38 and reduce friction between inner surface 60 of star gear 38 and interface surface 52 of journal bearing 44 as star gear 38 rotates. To ensure adequate thickness of the lubricant film, the rate the lubricant is fed to interface surface 52 of the journal bearing 44 varies and is determined by the pressure profile and temperature at the interface between star gears 38 and journal bearings 44. In one embodiment, the flow rate of the lubricant provides interface surface 52 of journal bearing 44 with a minimum lubricant film thickness of between about 0.00254 mm (100 micro inches) and 0.0508 mm (2000 micro inches).

As shown in FIG. 2, journal bearing 44 extends radially outward from an axis of symmetry that generally aligns with axial passage 54 to outermost interface surface 52. Star gear 38 has inner surface 60 that extends parallel to and fronts interface surface 52 of journal bearing 44. More particularly, inner surface 60 runs against interface surface 52 as star gear 38 rotates. Lubricant film (discussed previously) spreads circumferentially and axially in a boundary regime between interface surface 52 and inner surface 60 from distribution recess 58 due to viscous forces between star gear 38 and journal bearing 44.

The main body portions of star gear 38 and journal bearing 44 are typically made of steel. Commonly used steels include AMS 6265 and AMS 6308. In one embodiment, inner surface 60 is formed by a "soft" metal coating or liner, solid film coating material, or another bearing material which covers the inner portion of star gear 38. One such "soft" metal coating or liner can be comprised of a copper/lead alloy with a composition (by weight) of about 72 percent copper and 28 percent lead. The metal is "soft" in relation to the metal inner surface 60 is paired with and wears on (and against) journal bearing 44. In one embodiment, interface surface 52 of journal bearing 44 is comprised of AMS 6308 case-hardened by carburization and smoothed by a super-finishing manufacturing process, discussed subsequently. Together the composition of interface surface 52 (harder metal) and inner surface 60 (more soft metal) comprise a tribological pair. During operation inner surface 60 is worn by interface surface 52 (harder metal) such that inner surface 60 conforms to interface surface 52 to control friction therebetween. Interface surface 52 is super-finished to remove larger asperities and achieve an amorphous surface roughness of less than 5 micro inches (127 micro mm) measured on an $R_a$ scale. Super-finishing is a manufacturing technique involving the refinement of a surface of a part using mechanical and in some instances chemical processes. An amorphous surface is one that has no directional surface pattern left to it. Thus, with an amorphous surface, surface asperities are removed or substantially reduced in a random pattern rather than being laid in a particular direction as associated with honing or grinding. Thus, surface roughness of inner surface 60 also becomes relatively smooth due to operational wear of the tribological pair. This reduces friction between journal bearing 44 and star gear 38, allowing for increased moment capability of epicyclic gear system 36 and reducing bearing/lubricant temperatures in the boundary regime condition between inner surface 60 and interface surface 52. In other embodiments, the liner, coating, film or other soft bearing material can be disposed on journal bearing 44 to form interface surface 52 rather than inner surface 60, and inner surface 60 can be steel case-hardened by carburization and smoothed by super-finishing manufacturing process.

In one embodiment, interface surface 52 is super-finished in various manners such as are described in U.S. Pat. Nos. 4,491,500, 4,818,333, 5,503,481, and 7,005,080 and United States Patent Application Publication No. 2002/0106978, which are herein incorporated by reference. More particularly, reactive chemicals in solution are added to a mass finishing device (for example a vibratory bowl or tumbling barrel) in combination with metallic, ceramic or plastic bodies (called "media") and one or more journal bearings 44. The chemicals include phosphoric acid or phosphates, sulfamic acid, oxalic acid or oxalates, sulfuric acid or sulfates, chromic acid or chromates, bicarbonate, fatty acids or fatty acid salts, or mixtures of these materials. The solution may also contain an activator or accelerator, such as zinc, magnesium, iron phosphates and the like, as well as inorganic or organic oxidizers, such as peroxides, meta-nitrobenzene, chlorate, chlorite, persulfates, nitrate, and nitrite compounds. A variety of chemical solutions useful to the super-finishing process are sold commercially by REM Chemicals, Inc of Brenham, Tex. and Southington, Conn. These solutions include acid/salt components in a weight percent range of approximately 15% to 45%, promoters of about 1% by weight, and oxidizers in a range of 0% to 15% by weight. The selected chemicals are mildly reactive to the metal, creating a soft coating (called "blackmode") on interface surface 52, which is removed through vibratory agitation of journal bearing(s) 44 with the media. In some instances, it may be desirable to introduce a second chemical solution into the vibratory bowl to further burnish journal bearing(s) 44.

A vibratory bowl is a conventional vibratory finishing unit and can be operated at 800 to 1500 revolutions per minute, at an amplitude of 1 to 8 millimeters. During operation, the chemical solution can be added on a flow-through basis, such that fresh solution is continuously introduced and used solution is continuously drawn off and discarded. Solution may be introduced at a rate of between about 0.25-0.4 gallons per hour per cubic foot (0.027-0.043 liters per hour per cubic meter). Operation of the equipment will generate heat that typically increases the temperature of the vibratory system (media, solution and parts) to about 35° C. over time.

The media can be abrasive or non-abrasive. Suitable ceramic media are composed of silica and alumina, in combination with other metal oxides. In one embodiment, media having a hardness of approximately 57 on the Barcol scale, can be used with the super-finishing process. Specifically, media such as TROWALPLAST PP can be used. This media is sold by Walther Trowal, Ltd., with a United States subsidiary in Grand Rapids, Mich. The media is composed of 50% (by weight) alumina bonded with an unsaturated polyester resin. It has a density of about 1.8 g/cm$^3$ and a crystal size of less than 0.9 mm. In another embodiment, media are composed of a metal (such as AISI grade 302 stainless steel) that is inert to the chemical treatment conditions. Metal media are available from various suppliers (for example Abbott Ball of West Hartford, Conn.) in a variety of shapes and sizes. A variety of processes and techniques as well as products (i.e. media, chemicals, solutions, and vibratory bowls) can be used to super-finish interface surface 52 of journal bearing 44 are commercially available through suppliers including RIM Chemical, Inc of Brenham, Tex. and Southington, Conn. As a result of the super-finishing process, interface surface 52 achieves a surface roughness of less than 5 micro inches (127 micro mm) measured on an $R_a$ scale. The smoothness of interface surface 52 along with its tribological pairing with inner surface 60 allows epicyclic gear system 36 to achieve the benefits previously discussed.

Figure 3:
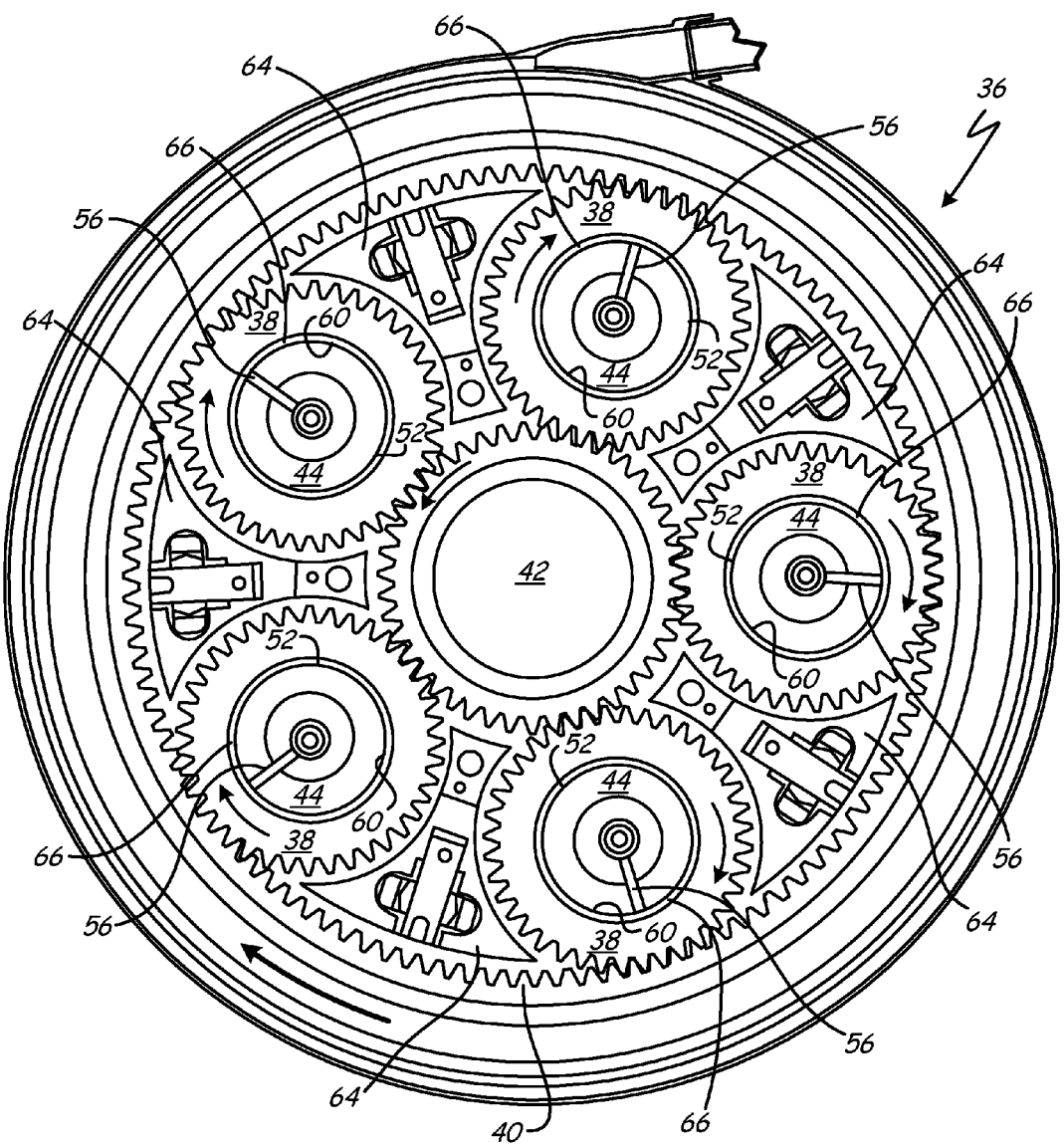
FIG. 3 is a diagrammatic view of the entire epicyclic gear system taken along section 3-3 of FIG. 2.

FIG. 3 shows a schematic, view of the entire epicyclic gear system 36 taken along section 3-3 of FIG. 2. Because FIG. 3 shows the entire epicycle gear system 36, a plurality of star gears 38 are illustrated. These star gears 38 are mounted on carrier 48 by a plurality of journal bearings 44. In addition to the components previously discussed, epicyclic gear system 36 includes baffles or spray bars 64. FIG. 3 also better illustrates soft metal liner 66 on inner portion of star gear 38.

As discussed previously with reference to FIG. 2, lubricant introduced into the journal bearing/star gear interface spreads axially and circumferentially to form a load supporting lubricant film between journal bearing 44 outer surface and star gear 38 inner surface. After forming a film between journal bearing 44 and star gear 38, lubricant is discharged from the axial extremities of the bearing interface. Substantially all of the discharged lubricant is directed into the sun/star mesh, partly because of the presence of the nearby baffle 64. The directed lubricant cools and lubricates the sun and star gear teeth and then is expelled from the sun/star mesh. The adjacent baffle 64 then guides substantially all of the expelled lubricant radially outwardly into the star/ring mesh. The lubricant is then ejected from the star/ring mesh and centrifugally channeled away from epicyclic gear system 36.

FIG. 3 shows liner 66 which comprises the inner portion of each star gear 38. Liner 66 defines inner surface 60 of each star gear 38. As previously discussed, liner 66 is formed by a soft metal material and wears against interface surface 52 of journal bearing 44. Together the composition of interface surface 52 (harder metal) and inner surface 60 (more soft metal) comprise a tribological pair. During operation inner surface 60 is worn by interface surface 52 (harder metal) such that inner surface 60 conforms to interface surface 52 to control friction therebetween. The super-finishing of interface surface 52 allows the interface surface 52 to achieve a surface roughness of less than 5 micro inches (127 micro mm) measured on an $R_a$ scale, and due to tribological pairing of interface surface 52 with inner surface 60, surface roughness of inner surface 60 also becomes relatively smooth due to operational wear. Thus, a reduction of friction can be achieved allowing for increased moment capability of epicyclic gear system 36 (i.e. star gear 38 can operate under greater applied forces before inner surface 60 seizes with interface surface 52) and reduced bearing/lubricant temperatures in the boundary regime between inner surface 60 and interface surface 52. By reducing the temperature in the boundary regime condition, operational wear between star gear 38 and journal bearing can be reduced, thus increasing the operation life of the epicyclic gear system 36. By increasing the moment capability of epicyclic gear system 36, the size and weight of epicyclic gear system 36 can be reduced.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A epicyclic gear assembly, comprising:
an assembly having a ring gear, sun gear, and at least one star gear enmeshed between the ring gear and sun gear;
a carrier disposed adjacent the rotatable sun gear and star gear; and
a journal bearing disposed in the at least one star gear and connected to the carrier, the journal bearing having an outer radial surface with an amorphous surface finish of less than about 5 micro inches (127 micro mm) measured on an $R_a$ scale;
wherein the outer radial surface interfaces with an inner surface of the star gear, and wherein the inner radial surface of the star gear is formed by a soft metal and the outer radial surface of the journal bearing formed by a hard metal such that during operation of the epicyclic gear assembly the inner radial surface of the star gear is worn by the outer radial surface of the journal bearing such that the inner radial surface of the star gear conforms to the outer radial surface of the journal bearing.

2. The assembly of claim 1, wherein the soft metal comprises a copper/lead alloy.

3. The assembly of claim 2, wherein the hard metal comprises a steel.

4. The assembly of claim 2, wherein the steel comprises AMS 6308 and the copper/lead alloy is comprised of about 72 percent copper and about 28 percent lead.

5. The assembly of claim 1, wherein the outer radial surface is super-finished to achieve the surface finish.

6. The assembly of claim 5, wherein the outer radial surface of the journal bearing is super-finished within a vibratory bowl.

7. An epicyclic gear assembly, comprising:
an assembly having a ring gear, sun gear, and at least one star gear enmeshed between the ring gear and sun gear;

a carrier disposed adjacent the rotatable sun gear and star gears; and a journal bearing disposed within each star gear and connected to the carrier, each journal bearing having a radial outer portion comprised of a softer metal which defines the outer radial surface of the journal bearing;

wherein the outer radial surface interfaces with and is worn to operationally conform to an inner surface of the star gear, wherein the inner surface of the star gear is formed of a harder metal and has an amorphous surface finish of less than about 5 micro inches (127 micro mm) measured on an $R_a$ scale.

8. The assembly of claim 7, wherein the softer metal comprises a copper/lead alloy.

9. The assembly of claim 7, wherein the harder metal comprises a steel.

10. The assembly of claim 7, wherein the steel comprises AMS 6308 and the alloy is comprised of about 72 percent copper and about 28 percent lead.

11. A process of achieving an optimized journal bearing and star gear combination, comprising:

placing a journal bearing within a vibratory apparatus;

introducing a chemical solution into the vibratory apparatus, the chemical solution capable of reacting with the an outer radial surface of the journal bearing;

agitating the outer surface of the journal bearing with a media article within the vibratory apparatus;

providing a star gear with an inner radial portion comprised of soft metal which defines an inner surface of the star gear; and assembling the journal bearing with respect to the star gear such that the outer radial surface of the journal bearing interfaces with the inner surface of the star gear, wherein the outer radial surface of the journal bearing has an amorphous surface finish and the inner surface of the star gear operationally is worn by the outer radial surface of the journal bearing such that the inner radial surface of the star gear conforms to the outer radial surface of the journal bearing.

12. The process of claim 11, wherein the soft metal comprises a copper/lead alloy.

13. The process of claim 12, wherein the journal bearing comprises a steel.

14. The process of claim 13, wherein the steel comprises AMS 6308 and the copper/lead alloy is comprised of about 72 percent copper and about 28 percent lead.

* * * * *